US012566925B2

(12) United States Patent
Wang et al.

(10) Patent No.:    US 12,566,925 B2
(45) Date of Patent:        Mar. 3, 2026

(54) DIALOGUE STATE AWARE DIALOGUE SUMMARIZATION

(71) Applicant: Adobe Inc., San Jose, CA (US)

(72) Inventors: Haoliang Wang, Sunnyvale, CA (US);
Kaige Xie, Atlanta, GA (US); Tong Yu,
Fremont, CA (US); Junda Wu, Long
Island City, NY (US); Handong Zhao,
Cupertino, CA (US); Ruiyi Zhang, San
Jose, CA (US); Kanak Vivek Mahadik,
San Jose, CA (US); Ani Nenkova,
Philadelphia, PA (US)

(73) Assignee: Adobe Inc., San Jose, CA (US)

( * ) Notice: Subject to any disclaimer, the term of this
patent is extended or adjusted under 35
U.S.C. 154(b) by 216 days.

(21) Appl. No.: 18/343,389

(22) Filed: Jun. 28, 2023

(65) Prior Publication Data

US 2025/0005289 A1      Jan. 2, 2025

(51) Int. Cl.
G06F 40/35        (2020.01)
G06F 16/34        (2025.01)
G06F 16/35        (2025.01)
(52) U.S. Cl.
CPC ............ G06F 40/35 (2020.01); G06F 16/345
(2019.01); G06F 16/35 (2019.01)
(58) Field of Classification Search
CPC ........ G06F 40/35; G06F 16/345; G06F 16/35;
G06F 40/30
See application file for complete search history.

(56) References Cited

U.S. PATENT DOCUMENTS

| | | | |
|---|---|---|---|
| 2009/0157709 A1* | 6/2009 | Kruger | .............. G06F 16/90335 |
| 2020/0236068 A1* | 7/2020 | TeNyenhuis | ............ G06F 40/35 |
| 2022/0108086 A1* | 4/2022 | Wu | ......................... G06F 40/35 |
| 2024/0249113 A1 | 7/2024 | Liu et al. | |
| 2024/0427998 A1 | 12/2024 | Wang et al. | |
| 2025/0028751 A1 | 1/2025 | Yu et al. | |

OTHER PUBLICATIONS

Razavi, Unsupervised learning: K-means clustering, https://
towardsdatascience.com/unsupervised-learning-k-means-clustering-
27416b95af27/, Jun. 27, 2022 (Year: 2022).*

(Continued)

*Primary Examiner* — Linda Wong
(74) *Attorney, Agent, or Firm* — FIG. 1 Patents

(57)        ABSTRACT

Dialogue state aware dialogue summarization techniques are
described that enable generation of dialogue summaries
from target domains with limited training data. A content
processing system, for instance, generates one or more
clusters based on training dialogues from one or more source
domains. The clusters represent domain-specific features of
the training dialogues and are further based on dialogue
states of the training dialogues. The content processing
system trains a machine learning model to generate sum-
maries of dialogues by using the one or more clusters as
prefixes in a prefix-tuning approach. The content processing
system receives an input that includes a dialogue from a
target domain. The content processing system generates an
input prompt based on the dialogue and the one or more
clusters, and the model generates a summary of the dialogue
based on the input prompt.

20 Claims, 8 Drawing Sheets

(56) References Cited

OTHER PUBLICATIONS

Artley, Understanding Prefix Tuning: A Novel Approach to Fine-Tuning Language Models, https://medium.com/@razavipour6/understanding-prefix-tuning-a-novel-approach-to-fine-tuning-language-models-dc7dafeb32e4, May 16, 2023 (Year: 2023).*

Lin et al, Topic-Oriented Dialogue Summarization, May 4, 2023, IEEE ACM Transactions on Audio, Speech, and Language Processing, vol. 31, 2023, pp. 1797-1810 (Year: 2023).*

Brown, Tom , et al., "Language Models are Few-Shot Learners", Advances in Neural Information Processing Systems [retrieved Mar. 27, 2023]. Retrieved from the Internet <https://armatech.us/OpenLanding/Language%20Models%20are%20Few-Shot%20Learners.pdf>., Jul. 22, 2020, 25 Pages.

Chen, Jiaao , et al., "Multi-view sequenceto-sequence models with conversational structure for abstractive dialogue summarization", Cornell University arXiv, arXiv.org [retrieved Mar. 23, 2023]. Retrieved from the Internet <https://arxiv.org/pdf/2010.01672.pdf>., Oct. 4, 2020, 13 Pages.

Fabbri, Alexander R, et al., "Improving Zero and Few-Shot Abstractive Summarization with Intermediate Fine-tuning and Data Augmentation", Cornell University arXiv, arXiv.org [retrieved Mar. 23, 2023]. Retrieved from the Internet <https://arxiv.org/pdf/2010.12836.pdf>., Apr. 11, 2021, 14 Pages.

Feng, Xiachong , et al., "A Survey on Dialogue Summarization: Recent Advances and New Frontiers", Cornell University arXiv, arXiv.org [retrieved Mar. 23, 2023]. Retrieved from the Internet <https://arxiv.org/pdf/2107.03175.pdf>., Apr. 28, 2022, 9 Pages.

Goo, Chih-Wen , et al., "Abstractive dialogue summarization with sentence-gated modeling optimized by dialogue acts", Cornell University arXiv, arXiv.org [retrieved Mar. 23, 2023]. Retrieved from the Internet <https://arxiv.org/pdf/1809.05715.pdf>., Sep. 29, 2018, 8 Pages.

Herskowitz, Nicole , "Microsoft Teams Premium: Cut costs and add AI-powered productivity", Microsoft Teams [retrieved Mar. 23, 2023]. Retrieved from the Internet <https://www.microsoft.com/en-us/microsoft-365/blog/2023/02/01/microsoft-teams-premium-cut-costs-and-add-ai-powered-productivity/>., Nov. 22, 2022, 13 Pages.

Kingma, Diederik P, et al., "Adam: A Method for Stochastic Optimization", Cornell University, arXiv Preprint, arXiv.org [retrieved Aug. 9, 2023]. Retrieved from the Internet <https://arxiv.org/pdf/1412.6980.pdf>., Jan. 30, 2017, 15 pages.

Lewis, Mike , et al., "Bart: Denoising Sequence-to-Sequence Pre-training for Natural Language Generation, Translation, and Comprehension", Cornell University arXiv, arXiv.org [retrieved Mar. 23, 2023]. Retrieved from the Internet <https://arxiv.org/pdf/1910.13461.pdf>., Oct. 29, 2019, 10 Pages.

Li, Xiang Lisa , "Prefix-Tuning: Optimizing Continuous Prompts for Generation", Cornell University arXiv, arXiv.org [retrieved Mar. 23, 2023]. Retrieved from the Internet <https://arxiv.org/pdf/2101.00190.pdf>., Jan. 1, 2021, 15 Pages.

Lin, Chin-Yew , "Rouge: A Package for Automatic Evaluation of Summaries", Information Sciences Institute University of Southern California [retrieved Mar. 23, 2023]. Retrieved from the Internet <https://aclanthology.org/W04-1013.pdf>., Jul. 25, 2004, 8 pages.

Liu, Zhengyuan , et al., "Topic-aware pointer-generator networks for summarizing spoken conversations", Cornell University arXiv, arXiv.org [retrieved Mar. 23, 2023]. Retrieved from the Internet <https://arxiv.org/pdf/1910.01335.pdf>., Oct. 3, 2019, 8 Pages.

Rajpurkar, Pranav , et al., "Know What You Don't Know: Unanswerable Questions for SQuAD", Cornell University arXiv, arXiv.org [retrieved Mar. 24, 2023]. Retrieved from the Internet <https://arxiv.org/pdf/1806.03822.pdf>., Jun. 11, 2018, 9 Pages.

Reimers, Nils , et al., "Sentence-Bert: Sentence Embeddings using Siamese Bert-Networks", Cornell University arXiv, arXiv.org [retrieved Jul. 12, 2023]. Retrieved from the Internet <https://arxiv.org/pdf/1908.10084.pdf>., Aug. 27, 2019, 11 Pages.

Saha, Amrita , et al., "Mining Root Cause Knowledge from Cloud Service Incident Investigations for AIOps", Cornell University arXiv, arXiv.org [retrieved Mar. 23, 2023]. Retrieved from the Internet <https://arxiv.org/pdf/2204.11598.pdf>., Apr. 21, 2022, 10 Pages.

Samanta, Suranjana , et al., "Carbon to Diamond: An Incident Remediation Assistant System From Site Reliability Engineers' Conversations in Hybrid Cloud Operations", Proceedings of the AAAI Conference on Artificial Intelligence, vol. 35, No. 17 [retrieved Mar. 23, 2023]. Retrieved from the Internet <https://ojs.aaai.org/index.php/AAAI/article/view/17809>., May 18, 2021, 7 Pages.

Shetty, Manish , et al., "Neural Knowledge Extraction From Cloud Service Incidents", Cornell University arXiv, arXiv.org [retrieved Mar. 23, 2023]. Retrieved from the Internet <https://arxiv.org/pdf/2007.05505.pdf>., Jan. 15, 2021, 12 Pages.

Shetty, Manish , et al., "SoftNER: Mining Knowledge Graphs From Cloud Incidents", Cornell University arXiv, arXiv.org [retrieved Mar. 23, 2023]. Retrieved from the Internet <https://arxiv.org/pdf/2101.05961.pdf>., Jun. 23, 2021, 15 Pages.

Wolf, Thomas , et al., "Transformers: State-of-the-Art Natural Language Processing", Proceedings of the 2020 Conference on Empirical Methods in Natural Language Processing: System Demonstrations [retrieved Mar. 23, 2023]. Retrieved from the Internet <https://aclanthology.org/2020.emnlp-demos.6.pdf>., Oct. 2020, 8 Pages.

Yu, Tiezheng , et al., "AdaptSum: Towards Low-Resource Domain Adaptation for Abstractive Summarization", Cornell University arXiv, arXiv.org [retrieved Mar. 23, 2023]. Retrieved from the Internet <https://arxiv.org/pdf/2103.11332.pdf>., Apr. 22, 2021, 13 Pages.

Zhao, Lulu , et al., "Domain-Oriented Prefix-Tuning: Towards Efficient and Generalizable Fine-tuning for Zero-Shot Dialogue Summarization", Cornell University arXiv, arXiv.org [retrieved Mar. 23, 2023]. Retrieved from the Internet <https://arxiv.org/pdf/2204.04362.pdf>., Apr. 9, 2022, 15 Pages.

Zhao, Lulu , et al., "TODSum: Task-Oriented Dialogue Summarization with State Tracking", Cornell University arXiv, arXiv.org [retrieved Mar. 23, 2023]. Retrieved from the Internet <https://arxiv.org/pdf/2110.12680.pdf>., Oct. 25, 2021, 12 pages.

Zou, Yicheng , et al., "Low-Resource Dialogue Summarization with Domain-Agnostic Multi-Source Pretraining", Cornell University arXiv, arXiv.org [retrieved Mar. 23, 2023]. Retrieved from the Internet <https://arxiv.org/pdf/2109.04080.pdf>., Sep. 11, 2021, 12 Pages.

"Non-Final Office Action", U.S. Appl. No. 18/339,694, Oct. 1, 2025, 15 pages.

"Restriction Requirement", U.S. Appl. No. 18/355,901, Sep. 16, 2025, 6 pages.

Liu, et al., "What Makes Good In-Context Examples for GPT-3?", arXiv Preprint, Cornell University, Jan. 17, 2021, 12 pages.

Shwartz, et al., "Unsupervised Commonsense Question Answering with Self-Talk", arXiv Preprint, Cornell University, Nov. 2020, 15 pages.

* cited by examiner

200

400 —

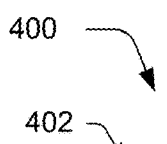

402 —

408

I'm looking for a train that leaves on Saturday and arrives by 10.30.

*Where are you traveling to and from?*

I am going to cambridge from birmingham new street.

*There are 5 trains available, may I book one for you that leaves at 7:40 and arrives at 10:23?*

What is the train ID?

*The train ID is TR8259.*

Yes, that train sounds good. Please book it for me.

Could you also find me a hotel with a moderate price that offers internet?

*Before we start on the hotel, did you need tickets for the train?*

No thank you, I was just pre-planning a route.

*There are 17 hotels listed. What part of town would you like to stay in?*

The north part of town please, preferably in a guesthouse.

*Cambridge has 8 moderately priced guesthouses in the north.*

*I would suggest Acorn Guest House, with a star rating of 4. Would you like me to book it?*

Yes please, I would like to book it for 7 people for 5 nights on Saturday, and I need a reference number.

*I'm very sorry I was unable to book at acorn guest house for 5 nights,*

*would you like to try for a shorter stay?*

Yes, please try to book it for four nights instead.

*Your booking was successful, the reference number is WAEYAQOM.*

*May I assist you with anything else today?*

No, that should be all for now. Thank you for the help!

*You are welcome, have a great trip!*

404 —

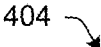

The user is going to cambridge from birmingham new street. Could you also find me a hotel with a moderate price that offers internet? I would like to book it for 7 people for 5 nights on Saturday, and I need a reference number.

406 —                                                                          118

The user is looking for a train that leaves on Saturday and arrives by 10:30. Could you also find me a hotel with a moderate price that offers internet? Cambridge has 8 moderately priced guesthouses in the north. I would suggest Acorn Guest House, with a star rating of four.

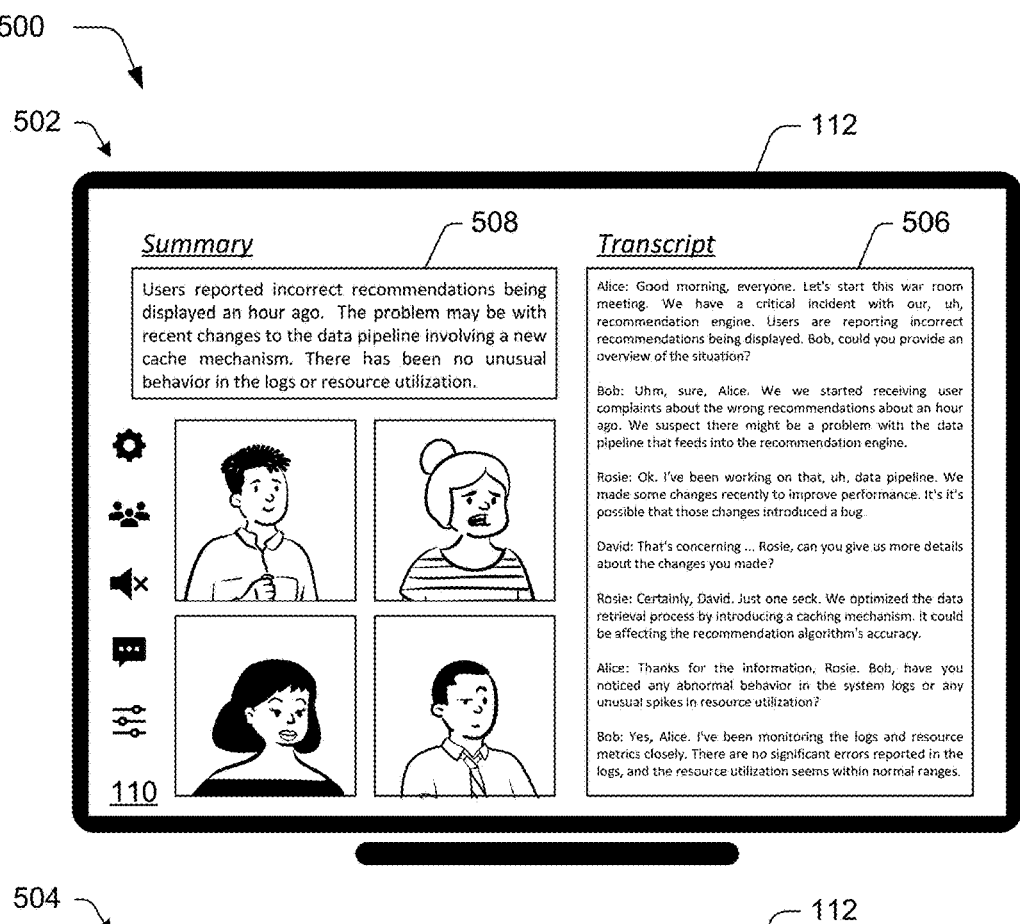

508

_Summary_

Users reported incorrect recommendations being displayed an hour ago. The problem may be with recent changes to the data pipeline involving a new cache mechanism. There has been no unusual behavior in the logs or resource utilization.

110

506

_Transcript_

Alice: Good morning, everyone. Let's start this war room meeting. We have a critical incident with our, uh, recommendation engine. Users are reporting incorrect recommendations being displayed. Bob, could you provide an overview of the situation?

Bob: Uhm, sure, Alice. We we started receiving user complaints about the wrong recommendations about an hour ago. We suspect there might be a problem with the data pipeline that feeds into the recommendation engine.

Rosie: Ok. I've been working on that, uh, data pipeline. We made some changes recently to improve performance. It's it's possible that those changes introduced a bug.

David: That's concerning ... Rosie, can you give us more details about the changes you made?

Rosie: Certainly, David. Just one seck. We optimized the data retrieval process by introducing a caching mechanism. It could be affecting the recommendation algorithm's accuracy.

Alice: Thanks for the information, Rosie. Bob, have you noticed any abnormal behavior in the system logs or any unusual spikes in resource utilization?

Bob: Yes, Alice. I've been monitoring the logs and resource metrics closely. There are no significant errors reported in the logs, and the resource utilization seems within normal ranges.

504

112

510

_Summary_

Users reported incorrect recommendations being displayed an hour and a half ago. The root cause may be related to a user preference module returning incorrect data. A customer-facing message that explains the issue is being drafted.

110

506

_Transcript_

Alice: Rosie, has the rollback shown any improvement in the recommendation accuracy?

Rosie: Unfortunately, Alice, the rollback didn't resolve the issue. Users are still reporting incorrect recommendations.

Bob: I've been analyzing the recommendation logs, and I noticed that a particular module responsible for user preferences seems to be returning incorrect data. It might be the root cause.

Alice: Good observation, Bob. Rosie, can you review that module and check if there are any recent changes or bugs?

Rosie: Absolutely, Alice. I'll dig into the code and investigate that module specifically. Hopefully, we'll find the problem there.

David: While Rosie investigates, we should prepare a communication plan to inform our users about the incident and set their expectations.

Alice: Good point, David. Let's uh draft a customer-facing message that explains the issue and assures them that we're actively working on a solution. We should also provide an estimated timeline for resolution, if possible.

David: I'll work on that and share. Yeah, work on it and share.

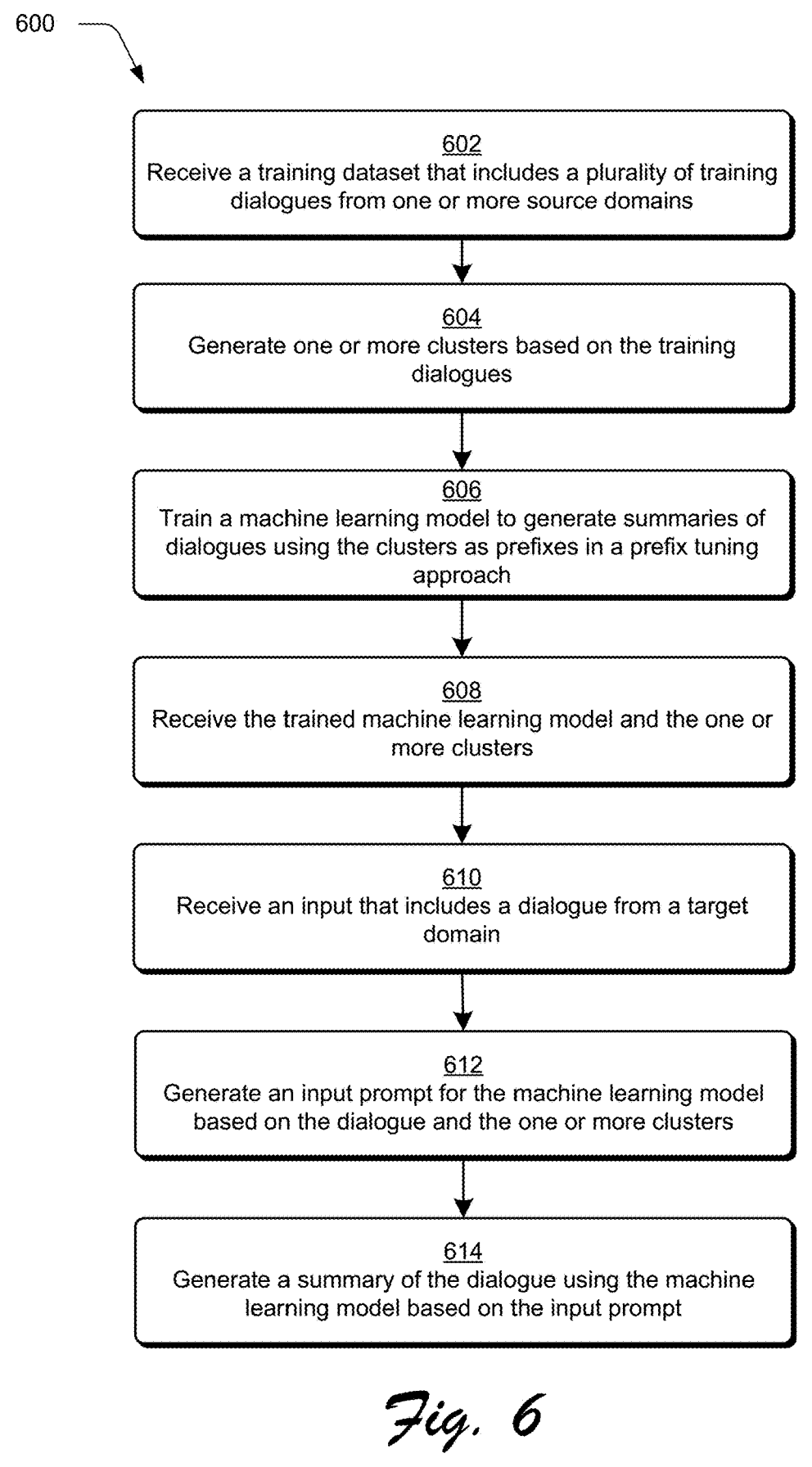

602
Receive a training dataset that includes a plurality of training dialogues from one or more source domains

604
Generate one or more clusters based on the training dialogues

606
Train a machine learning model to generate summaries of dialogues using the clusters as prefixes in a prefix tuning approach

608
Receive the trained machine learning model and the one or more clusters

610
Receive an input that includes a dialogue from a target domain

612
Generate an input prompt for the machine learning model based on the dialogue and the one or more clusters

614
Generate a summary of the dialogue using the machine learning model based on the input prompt

*Fig. 6*

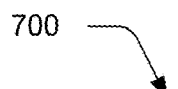

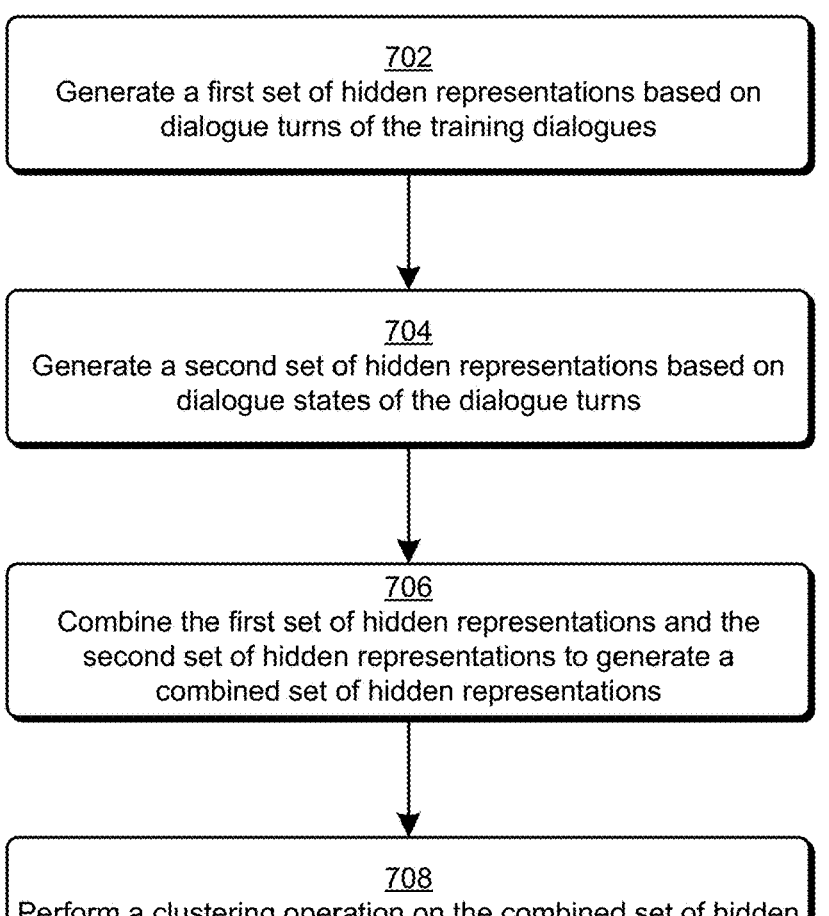

702
Generate a first set of hidden representations based on dialogue turns of the training dialogues 704
Generate a second set of hidden representations based on dialogue states of the dialogue turns 706
Combine the first set of hidden representations and the second set of hidden representations to generate a combined set of hidden representations 708
Perform a clustering operation on the combined set of hidden representations to generate the one or more clusters

DIALOGUE STATE AWARE DIALOGUE SUMMARIZATION

BACKGROUND

Systems and techniques for natural language processing (NLP) are often used for a variety of tasks such as text understanding, speech recognition, text generation, etc. For example, machine learning models are commonly used for text summarization tasks, such as to receive a corpus of text and generate a concise "summary" of the text. However, conventional text summarization models rely on extensive annotated data for training, which is not practical to collect for some domains. Accordingly, such conventional models perform poorly when used in unfamiliar domains. For instance, summaries generated by conventional models often fail to include relevant information in summaries for domain specific documents.

SUMMARY

Techniques for dialogue state aware dialogue summarization are described. In an example, a processing device implements content processing system to receive a plurality of training dialogues from one or more known source domains. The content processing system generates one or more clusters based on the training dialogues. The clusters, for instance, represent domain-specific features of the training dialogues. Further, the clusters are based in part on dialogue states of the training dialogues and thus incorporate dialogue-specific features as of the training dialogues as well. The content processing system then trains a machine learning model to generate summaries of input dialogues and the training includes using the one or more clusters as prefixes in a prefix-tuning approach.

The content processing system receives the trained machine learning model as well as an input that includes a dialogue from a target domain, e.g., an unseen domain different than the one or more source domains. Based on the dialogue and the one or more clusters, the content processing system generates an input prompt for the machine learning model. The machine learning model generates a summary of the dialogue based on the input prompt that considers dialogue-specific features as well as sentence-level topical information of the dialogue. In this way, the techniques described herein provide a modality to generate summaries that include key information from dialogues from an unseen domain that include noisy and/or domain specific content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 depicts an example of a comparison between a summary generated using conventional techniques and a summary generated in accordance with the techniques described herein.

FIG. 5 depicts an example of updating a summary of a transcript from a videoconference in real time in accordance with the techniques described herein.

FIG. 6 is a flow diagram depicting an algorithm as a step-by-step procedure in an example implementation that is performable by a processing device to generate a summary of a dialogue.

FIG. 7 is a flow diagram depicting an algorithm as a step-by-step procedure in an example implementation that is performable by a processing device to generate one or more clusters based on training dialogues for use in prefix-tuning.

DETAILED DESCRIPTION

Overview

Figure 1:
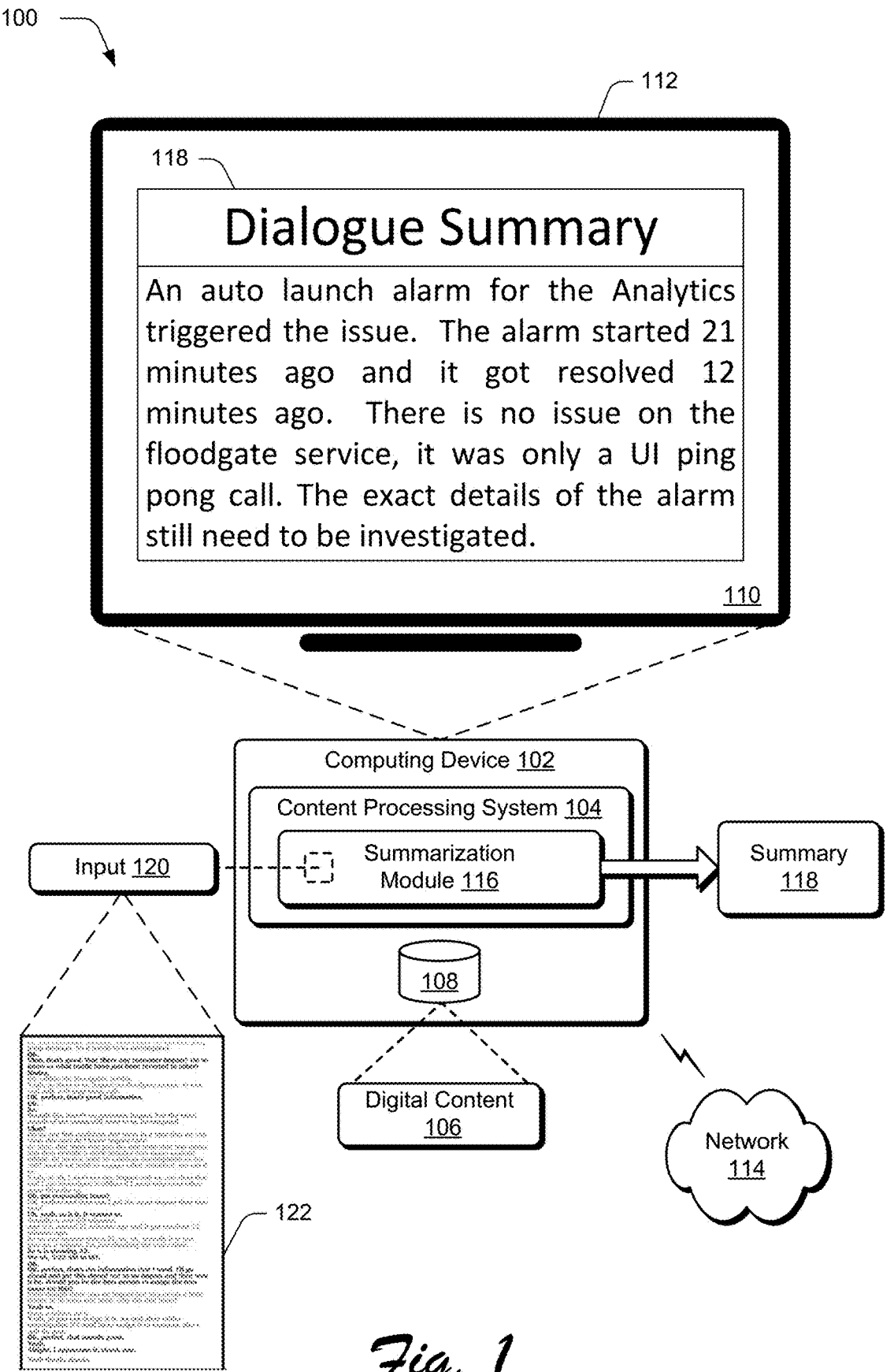
FIG. 1 is an illustration of a digital medium environment in an example implementation that is operable to employ the dialogue state aware dialogue summarization techniques described herein.

Text summarization models are a type of natural language processing model that are designed to receive a corpus of text, e.g., a document, and generate a concise and coherent summary of the text. The goal of text summarization models is to distill relevant information from the text into a shorter form while preserving its key content. Text summarization models support user efficiency, content organization, and data analysis which makes them useful tools in the field of natural language processing. Training text summarization models typically involves use of large amounts of labeled training data in a supervised learning process to teach the text summarization model to generate summaries.

However, acquiring domain-specific training data is costly and time-consuming, which makes it challenging to develop domain-specific text summarization models. For instance, collection of adequate training data is not practical in a variety of real-world contexts that include niche or evolving domain-specific information. Further, conventional summarization models perform poorly when provided with "noisy" inputs, e.g., a transcript of a dialogue with grammatical errors, multiple speakers, fragmented text, abbreviations/acronyms, subjective content, speech recognition errors, etc. Thus, conventional text summarization models often generate summaries that fail to include relevant information for input documents that are noisy or include extraneous/domain-specific information.

Accordingly, techniques and systems for dialogue state aware dialogue summarization are described that overcome these technical challenges and limitations to generate summaries of dialogues that are based on dialogue-specific features and incorporate sentence-level topical information. To circumvent the issues related to a lack of available training data for particular domains, the techniques described herein leverage training data from a source domain (e.g., a domain with available training data) to train a machine learning model to generate summaries of documents from a target domain, in which annotated training data is generally unavailable. The machine learning model is configured using a prefix-tuning approach that optimizes prefixes which guide the machine learning model during inferencing. In this way, the techniques described herein support increased accuracy and computational efficiency when generating summaries for noisy and/or domain specific documents such as dialogue transcripts in a low-shot/no-shot manner.

Consider an example in which a user is reviewing a document from a particular domain to extract relevant content, such as a transcript of a meeting between multiple site reliability engineers to address a technical system outage. Rather than manually review the document to understand the key content, which is time consuming and subject to error, the user wishes to use a text summarization model to generate a summary of the document. However, in this example training data that pertains to the particular domain is unavailable. Further, the document is noisy (e.g., multiple speakers, speech recognition errors, speaker hesitations, repetitions, etc.) and includes nuanced information that involves background knowledge to understand. Accordingly, conventional text summarization models are unable to generate an accurate summary of the transcript.

Accordingly, using the techniques described herein a processing device implements a content processing system to configure a machine learning model to generate summaries for dialogues from "unseen" target domains using sample dialogues from one or more known source domains. In an example to do so, the content processing system receives sample dialogues from the one or more source domains. In this example the sample dialogues are annotated and serve as labeled training data. For each sample dialogue, the content processing system embeds each dialogue turn (e.g., each sentence and/or utterance) to generate a first set of hidden representations.

The content processing system is further operable to determine dialogue states for each dialogue turn of the sample dialogues. Generally, the dialogue states represent key information of respective dialogue turns, such as user intent, dialogue history, contextual information, etc. By way of example, a sentence from a sample dialogue pertains to a price range of a restaurant, and the dialogue state of the sentence is "inexpensive." The dialogue states are determined using a pretrained dialogue state tracker (DST) to include structured data that encompasses various semantic attributes of the dialogue turns. For instance, the DST determines the dialogue states as slot-value pairs to represent information about the dialogue turns. The content processing system then generates a second set of hidden representations by embedding the dialogue states. By determining dialogue states of the sample dialogues, the techniques described herein are able to consider the dialogue nature of inputs.

The content processing system then concatenates the first set of hidden representations and the second set of hidden representations to generate a combined set of hidden representations. The content processing system is operable to perform a clustering operation, such as an unsupervised k-means clustering, on the combined set of hidden representations to generate one or more clusters. The clustering operation is used to group data points within the combined set of hidden representations based on a similarity to one another. For instance, the clusters are grouped based in part on the one or more source domains to which they belong, and thus the clusters represent domain-specific features of the sample dialogues. Further, because the clusters are based in part on the dialogue states, the clusters incorporate dialogue specific aspects of the sample dialogues.

Once the clusters are generated, the content processing system is operable to use the clusters in a prefix-tuning approach. Generally, prefix-tuning is used to train the machine learning model by optimizing one or more "prefixes" which can be prepended to an input during subsequent inferencing to influence the machine learning model to generate desirable outputs. In this way, the optimized prefixes are used to "guide" the machine learning model during inferencing. In an example, parameters of the machine learning model are fixed during prefix-tuning, while various parameters of the prefixes are learnable which conserves computational resources relative to conventional training. By using the clusters as prefixes during prefix-tuning, which are based on dialogue-specific aspects, the machine learning model is trained to be dialogue state aware which enhances the model's ability to generate accurate summaries. As a result of training, the content processing system generates an optimized cluster prefix based on the clusters as well as one or more additional default prefixes that are further able to guide the machine learning model during inferencing.

The content processing system then receives an input that includes a dialogue from a target domain. For instance, the target domain is different than the one or more source domains and does not have adequate training data available. Continuing with the above example, the dialogue includes the transcript that describes a meeting between multiple site reliability engineers to address a technical system outage.

The content processing system generates an input prompt that is based on the input dialogue and one or more of the prefixes, such as the cluster prefix and/or one or more of the default prefixes. To do so, the content processing system generates an embedding based on the dialogue, such as by embedding each token (e.g., a single unit of text such as a word, character, subword, etc.) of the dialogue. The content processing system then configures the input prompt to include the dialogue embedding, the cluster prefix, and the default prefix. Based on the input prompt, the machine learning model generates a summary of the dialogue.

Incorporation of the prefixes in the input prompt influences the machine learning model to generate desirable outputs, such that the summary includes relevant domain-specific information from the transcript without undue influence from noise. Thus, the techniques described herein support generation of summaries of dialogues from unseen domains using a dialogue states aware machine learning model that incorporates dialogue-specific features as well as sentence-level topical information. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the dialogue state aware dialogue summarization techniques described herein. The illustrated digital medium environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 8.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, summarization of the digital content 106, transformation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable in whole or in part via functionality available via the network 114, such as part of a web service or "in the cloud."

An example of functionality incorporated by the content processing system 104 to process the digital content 106 is illustrated as a summarization module 116. The summarization module 116 is configured to generate a summary 118 of an input 120 that includes text, such as a dialogue 122. Generally, the summary 118 represents a condensed version of the text of the input 120 and includes relevant information, key details, and/or main ideas of the input 120. In the illustrated example, the dialogue 122 represents a transcript of a conversation between multiple site reliability engineers to address a technical alert/system outage. The transcript is "noisy," for instance includes one or more disfluencies, incomplete sentences, grammatical errors, mispronunciations, speaker hesitations, overlapping speakers, etc. The transcript also includes domain-specific information, e.g., information that is particular to the system outage. Accordingly, conventional techniques for text summarization generate inaccurate and/or incomplete summaries for such inputs.

Accordingly, the summarization module 116 leverages training data from one or more source domains (e.g., a domain with available training data) to configure a machine learning model to perform dialogue summarization on dialogues from an unseen target domain, e.g., a domain with limited training data. The machine learning model is configured using a low-shot/no-shot domain adaptive prefix-tuning approach using one or more clusters as prefixes. The clusters represent domain-specific features of the training data (e.g., of the source domains) and are further based on dialogue states of the training data. In this way, the model is configured to consider dialogue-specific features and leverage sentence level topical information during dialogue summarization.

In the illustrated example, the summarization module 116 generates the summary 118. The summary 118 includes relevant information and preserves key content of the dialogue. For instance, the summary 118 describes a root cause of the alarm, details about the alarm, and action items discussed in the dialogue 122. In this way, the techniques described herein overcome the technical limitations and challenges of conventional techniques, which are reliant on large amounts of training data to configure summarization models for domain specific applications, which is often not feasible to obtain. Accordingly, conventional models fail to provide accurate responses to noisy inputs and/or inputs from unfamiliar domains. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Dialogue State Aware Dialogue Summarization

Figure 2:
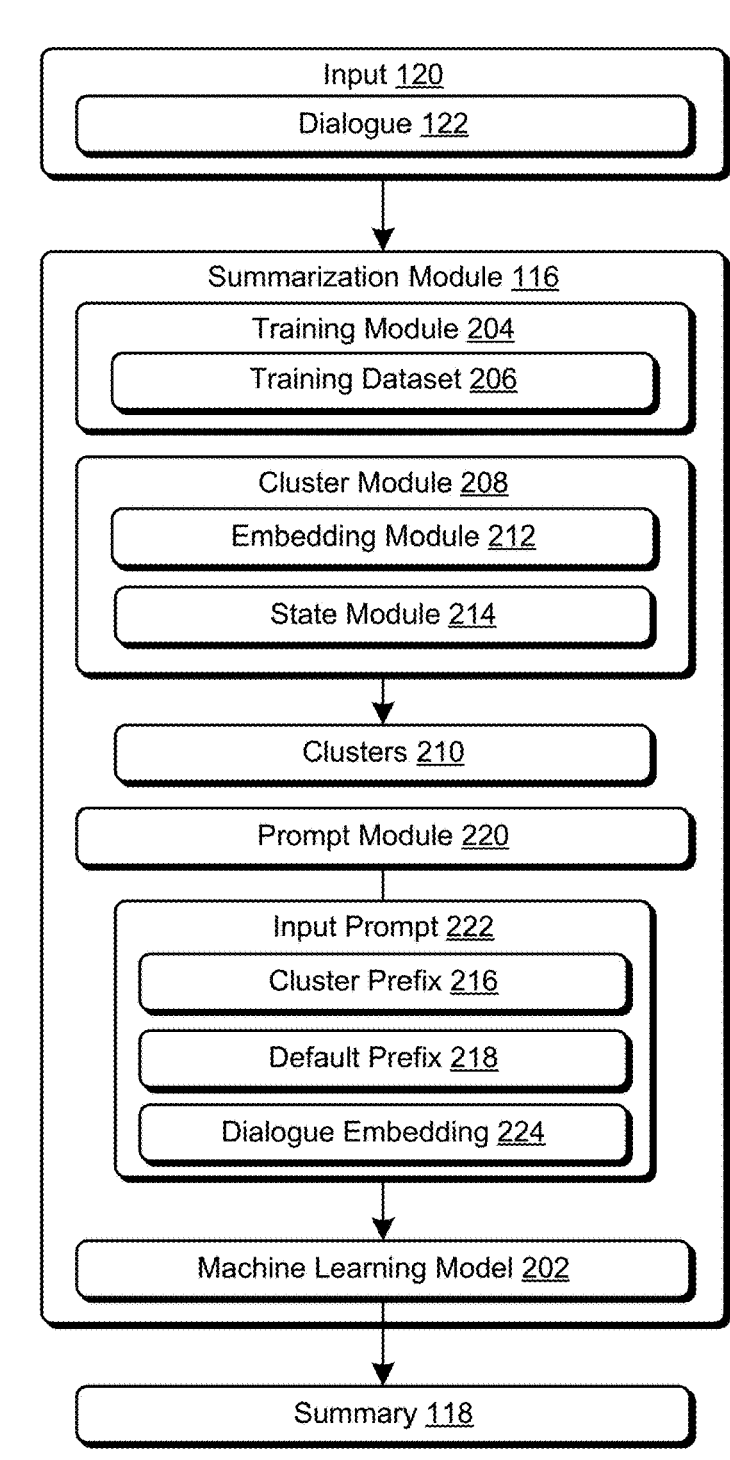
FIG. 2 depicts a system in an example implementation showing operation of a summarization module in greater detail.
Figure 3:
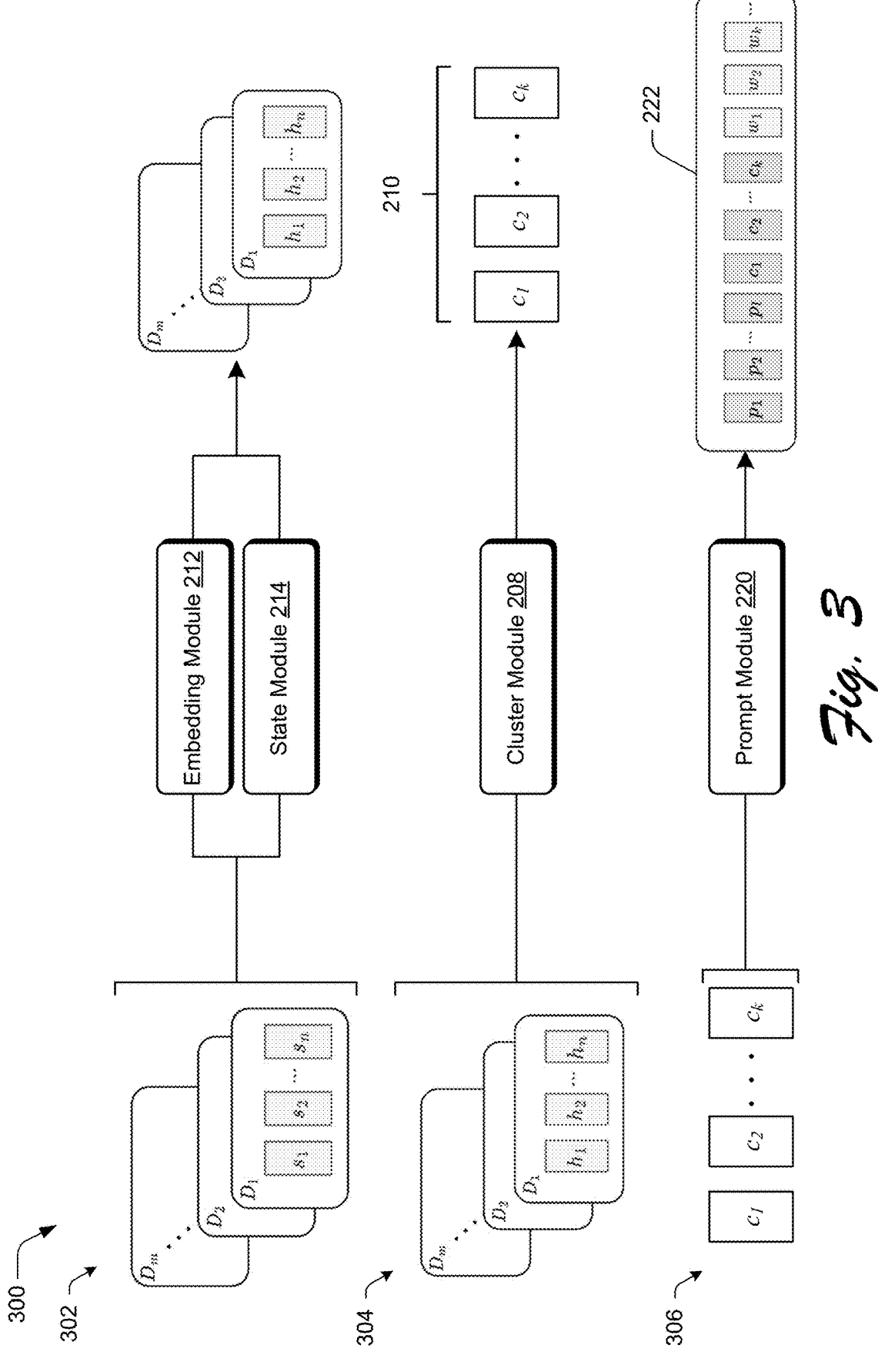
FIG. 3 depicts an example to configure a dialogue state aware machine learning model to perform dialogue summarization.

FIG. 2 depicts a system 200 in an example implementation showing operation of a summarization module 116 of FIG. 1 in greater detail. FIG. 3 depicts an example 300 to configure a dialogue state aware machine learning model to perform dialogue summarization. FIG. 4 depicts an example 400 of a comparison between a summary generated using conventional techniques and a summary generated in accordance with the techniques described herein. FIG. 5 depicts an example 500 of updating a summary of a transcript from a videoconference in real time in accordance with the techniques described herein. FIG. 6 is a flow diagram depicting an algorithm as a step-by-step procedure 600 in an example implementation that is performable by a processing device to generate a summary of a dialogue. FIG. 7 is a flow diagram depicting an algorithm as a step-by-step procedure 700 in an example implementation that is performable by a processing device to generate one or more clusters based on training dialogues for use in prefix-tuning.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5 and in parallel to the procedure 600 of FIG. 6 and the procedure 700 of FIG. 7.

FIG. 2 depicts a system 200 in an example implementation showing operation of a summarization module 116 in greater detail. Generally, the summarization module 116 is operable to receive a machine learning model 202 to generate summaries 118 of a corpus of text, such as one or more dialogues 122. In various examples, the summarization module 116 trains the machine learning model 202, such as by using a prefix-tuning approach as further described below.

For example, the summarization module 116 includes a training module 204 that is operable to receive a training dataset 206 that includes a plurality of training dialogues (block 602). Generally, the training dialogues represent dialogues from one or more "known" source domains, e.g., domains with sufficient labelled data. The training dialogues include a transcript particular to the one or more source domains, e.g., a transcript of a conversation between two or more parties that has multiple dialogue turns. A dialogue turn represents a unit of conversation such one or more sentences/utterances between a first party and a second party. In an example, a dialogue turn includes a "back-and-forth" between two or more participants in the dialogue.

In various examples, the training dialogues are annotated such that in addition to a transcript, each training dialogue includes a training summary that is a concise representation of key information from the respective training dialogue. Additionally or alternatively, the training dialogues include dialogue state annotations for one or more of the dialogue turns. As further described below, dialogue states generally represent content and/or a context of a particular dialogue turn, and capture information exchanged between one or more parties throughout the conversation. Thus, the dialogue state annotations include information such as a user's goal, a query, a task being discussed, a context of a portion of the dialogue, relevant entities or attributes, key data or information that has been provided, etc. for each dialogue turn in the training dialogues. In one example, the training dataset 206 is a TODSum dataset such as described by Zhao, et al. TODSum: Task-oriented dialogue summarization with state tracking. arXiv preprint arXiv:2110.12680 that includes various annotated dialogues from several (e.g., five) different source domains.

The summarization module 116 includes a cluster module 208 that is operable to generate one or more clusters 210 based on the training dialogues (block 604). Generally, the clusters 210 represent domain-specific features of the training dataset 206. Additionally, as further described below, generation of the clusters 210 is based in part on dialogue states of the training dialogues, and thus the clusters 210 are further representative of dialogue-specific features of the training dialogues. In this way, the clusters 210 represent sentence-level topical knowledge of the training dialogues.

FIG. 7 depicts an algorithm as a step-by-step procedure 700 in an example implementation that is performable by a processing device to generate the one or more clusters 210. In various embodiments, one or more steps of the procedure 700 are performed as substeps of block 604. For example, the cluster module 208 includes an embedding module 212 that is operable to generate a first set of hidden representations based on dialogue turns of the training dialogues (block 702). The embedding module 212, for instance, embeds each dialogue turn (e.g., each sentence and/or utterance) of a particular training dialogue to generate the first set of hidden representations. Accordingly, in various examples the first set of hidden representations includes a hidden representation for each sentence and/or user utterance in the particular training dialogue. In one or more examples, the embedding module 212 leverages a pretrained model to generate the first set of hidden representations, such as a sentence-BERT model as described by Reimers, et al. *Sentence-BERT: Sentence embeddings using Siamese BERT-networks*. In Proceedings of the 2019 Conference on Empirical Methods in Natural Language Processing and the 9th International Joint Conference on Natural Language Processing, pp. 3982-3992. (2019).

The embedding module 212 is further operable to generate a second set of hidden representations based on dialogue states of the dialogue turns (block 704). For instance, the cluster module 208 includes a state module 214 that is operable to track dialogue states of each respective dialogue turn in the training dialogues. Generally, the dialogue states represent key information of respective dialogue turns, such as user intent, dialogue history, contextual information, etc.

In one example, the state module 214 leverages a pre-trained dialogue state tracker (DST) to determine the dialogue states as structured data that encompasses various attributes, e.g., semantic attributes, of the dialogue turns. For instance, the state module 214 leverages the DST to determine the dialogue states as slot-value representations, such as slot-value pairs, to represent pieces of information about the dialogue turns. In this example, each slot represents a specific aspect or variable of the training dialogues, such as user preferences and/or system knowledge. For example, a slot-value pair ([slot, value]) is [food, Italian]. This is by way of example and not limitation, and in various examples the dialogue states are representable in a variety of formats such as belief states, semantic frames, distributed representations, etc.

The embedding module 212 generates the second set of hidden representations by embedding the dialogue states. In an example, the state module 214 concatenates the slot-value pairs together to treat the slot-value pairs as a "sentence." The embedding module 212 then embeds the concatenated slot-value pairs to generate the second set of hidden representations. In this way, the second set of hidden representations includes a hidden representation for each dialogue turn (e.g., sentence and/or user utterance) in a particular training dialogue. The embedding module 212 then combines the first set of hidden representations and the second set of hidden representations to generate a combined set of hidden representations (block 706). The embedding module 212 is operable to repeat this process for each training dialogue in the training dataset 206, such that each training dialogue is associated with a combined set of hidden representations.

The cluster module 208 then performs a clustering operation on the combined sets of hidden representations to generate the one or more clusters (block 708). In one example, the clustering operation includes an unsupervised k-means clustering that the cluster module 208 performs on the combined set of hidden representations to generate the clusters 210. The k-means clustering, for instance, is used to group data points within the combined set of hidden representations based on one or more similarity metrics. Thus, the clusters 210 represent domain-specific features of the training dialogues, e.g., the clusters 210 are grouped based on the one or more source domains. Further, because the clusters 210 are based in part on the dialogue turns and/or the dialogue states, the clusters represent dialogue specific aspects of the training dialogues.

The training module 204 then trains the machine learning model 202 to generate summaries of dialogues using the clusters 210 as prefixes in a prefix-tuning approach (block 606). Generally, the prefix-tuning approach is a domain-adaptation technique used to train the machine learning model 202 by optimizing one or more "prefixes" which are prepended to an input during subsequent inferencing to influence the machine learning model 202 to generate desirable outputs. In this way, the optimized prefixes guide the machine learning model 202 during inferencing.

In an example, parameters of the machine learning model 202 are fixed during prefix-tuning, while various parameters of the prefixes are trainable. Thus, prefix-tuning conserves computational resources relative to conventional model training techniques that update various parameters of transformers of models during training. Conventional prefix-tuning approaches fail to consider a dialogue nature of inputs, and further fail to leverage intrinsic domain knowledge included in dialogue-based inputs, and thus are unable to generate accurate summaries for domain-specific dialogues. Some conventional approaches attempt to incorporate domain keywords, however such approaches have a limited scope because the keywords are present in multiple different domains.

To overcome these limitations, the training module 204 leverages the training dataset 206 to train the machine learning model 202, for instance by using the training dialogues to generate the one or more clusters 210 as described above and using the clusters 210 as prefixes for prefix-tuning. In various examples, training the machine learning model 202 includes determining a validation loss, e.g., based on a measure of discrepancy between predicted outputs of the machine learning model 202 and the annotations of the training dialogues. In one or more embodiments, during prefix-tuning the training module 204 generates and/or optimizes one or more cluster prefixes 216 that are based on the clusters 210 as well as one or more additional default prefixes 218 that are further able to guide the machine learning model 202 during inferencing.

The cluster prefixes 216 and the one or more default prefixes 218, for example, are a sequence of continuous task-specific vectors. The cluster prefixes 216 and/or the default prefixes 218 include various parameters that are learnable during training, while parameters of the machine learning model 202 are fixed. Because the clusters 210 are based on dialogue-specific features, the machine learning model 202 is trained to be dialogue state aware, which enhances the ability of the machine learning model 202 to generate accurate summaries 118 for domain specific inputs as well as "noisy" inputs such as various dialogues. This overcomes limitations of conventional prefix-tuning approaches that fail to consider a dialogue nature of inputs and do not leverage intrinsic domain knowledge.

Accordingly, the summarization module 116 receives the trained machine learning model and the one or more clusters 210 (block 608). In some examples, the summarization module 116 receives the cluster prefixes 216 generated in accordance with the techniques described above. Additionally or alternatively, the summarization module 116 is operable to generate the cluster prefixes 216 based on the received clusters 210. The summarization module 116 is further operable to receive additional prefixes generated during training of the model, such as the one or more default prefixes 218.

In one example, the machine learning model 202 is a BART-large model such as described by Lewis, et al. *BART: Denoising sequence-to-sequence pre-training for natural language generation, translation, and comprehension*. In Proceedings of the 58th Annual Meeting of the Association for Computational Linguistics, pp. 7871-7880 (2020). In this example, the machine learning model 202 includes one or more Huggingface transformers such as described by Wolf, et al. *Transformers: State-of-the-art natural language processing*. In Proceedings of the 2020 conference on empirical methods in natural language processing: system demonstrations, pp. 38-45 (2020).

The summarization module 116 further receives an input 120 that includes a dialogue 122 from a target domain (block 610). The target domain, for instance, is different than the one or more source domains, and the dialogue 122 includes a transcript particular to the target domain. In various examples, the target domain represents an "unseen" domain, e.g., a domain that the machine learning model 202 has not encountered during training. Thus, the techniques described herein are low-shot and/or no-shot, such that limited and/or no training samples from the target domain are used to train the model, which obviates reliance on domain-specific training data. While in this example, the input 120 includes a dialogue 122, this is by way of example and not limitation and the techniques described herein are applicable to generate summaries of a variety of text inputs. Accordingly, in one or more embodiments the input 120 includes a variety of text-based documents.

The summarization module 116 includes a prompt module 220 that is operable to generate an input prompt 222 for the machine learning model 202 based on the dialogue 122 and the one or more clusters (block 612). To generate the input prompt 222, the prompt module 220 generates a dialogue embedding 224 based on the dialogue 122. For instance, the prompt module 220 converts tokens from the dialogue 122 into embeddings for inclusion in the input prompt 222. The input prompt 222 further includes the cluster prefix 216 based on the one or more clusters 210. In various examples, the prompt module 220 generates the cluster prefixes 216 based on the clusters 210 in accordance with the techniques described herein. Additionally or alternatively, the input prompt 222 includes the one or more default prefixes 218, for instance the one or more default prefixes 218 generated during training.

The summarization module 116 leverages the machine learning model 202 to generate a summary 118 of the dialogue 122 based on the input prompt 222 (block 614). In general, the summary 118 includes relevant information from the dialogue 122 and preserves key content of the dialogue 122. As described above, the input prompt 222 guides generation of the summary 118. Because the input prompt 222 is based in part on the clusters 210, which represent domain-specific features and are based in part on dialogue states, the machine learning model 202 is influenced to consider dialogue-specific aspects and leverage sentence-level topical knowledge when generating summaries 118. In this way, the techniques described herein overcome the technical limitations and challenges of conventional techniques, which fail to provide accurate responses to unfamiliar and/or noisy input dialogues and further are reliant on large amounts of training data, which is often not feasible to obtain for domain specific applications.

FIG. 3 depicts an example 300 to configure a dialogue state aware machine learning model to perform dialogue summarization in a first stage 302, a second stage 304, and a third stage 306. As depicted in first stage 302, a training dataset 206 that includes a plurality of training dialogues from various source domains are received. In this example, the training dialogues are represented as $D_1$, $D_2$, . . . $D_m$ where $D_m$ represents the "$m^{th}$" dialogue in the training dataset 206. For each dialogue in the training dataset, $D=[s_1, s_2, . . . s_n]$ where $s_i$ represents an "$i^{th}$" sentence of the dialogue D.

The embedding module 212 embeds each sentence within each training dialogue, for instance using Sentence-BERT as described above, to generate a first set of hidden representations for each training dialogue, e.g., $h_i$=Sentence-BERT $(s_i)$. In this way, the embedding module 212 generates a hidden representation for each sentence (e.g., each user utterance), i.e., $H=[h_1^u, h_2^u, . . . h_n^u]$.

Further, a state module 214 leverages a dialogue state tracker to determine dialogue states for each dialogue turn of the training dialogues. For instance, the state module 214 determines the dialogue states of each sentence $s_i$ as slot-value pairs. The state module 214 then concatenates the slot-value pairs together and treats the concatenated slot-value pairs as a single sentence, e.g., $ds_i$=DST ($s_i$), where DST represents the dialogue state tracker and $ds_i$ represents a particular dialogue state. The embedding module 212 then leverages Sentence-BERT to embed the concatenated slot-value pairs, such that $h_i^{ds}$=Sentence-BERT ($ds_i$). In this way, the embedding module 212 generates a second set of hidden representation that includes a hidden representation for each sentence, i.e. $H^{ds}$=[$h_1^{ds}$, $h_2^{ds}$, . . . $h_n^{ds}$]. The embedding module 212 then combines the first set of hidden representation and the second set of hidden representations, e.g., $h_i$=$h_i^u$ ⊗$h_i^{ds}$. This process is performed for each for each training dialogue.

As depicted in the second stage 304, a cluster module 208 generates a plurality of clusters 210, represented in this example as $c_1$, $c_2$, . . . $c_k$, based on the combined hidden representations. For instance, the cluster module 208 performs an unsupervised k-means clustering on the combined hidden representations to generate the clusters 210. The number of clusters k is a tunable hyperparameter. In this example, k=5. Thus, the result of the clustering operation is k number of clusters $c_1$, $c_2$, . . . $c_k$, and the clusters 210 represent k vectors.

In the third stage 306, the clusters 210 represent domain-specific features and are used as prefixes in prefix-tuning approach to train a machine learning model 202. In this example, the machine learning model 202 is trained with a learning rate linearly decaying from 5E−5, a batch size of 5, and default values for gradient clipping, dropout, and Adam, e.g., adaptive moment estimation such as described by Kingma, et al. *ADAM: A Method for Stochastic Optimization.* 3rd International Conference on Learning Representations. (2015). The model is trained for 50 epochs, and the training includes performing early stopping on a validation loss with a patience of 10 epochs.

As illustrated, a prompt module 220 generates an input prompt 222 for input to one or more transformers of the machine learning model 202 that includes the clusters $c_1$, $c_2$, . . . $c_k$. The input prompt also includes a plurality of default prefixes $p_1$, $p_2$, . . . , $p_l$ that are generated using the prefix-tuning approach. The input prompt 222 further includes a dialogue embedding 224 that includes embeddings of individual input tokens of and input dialogue 122, which are represented as $w_1$, $w_2$, $w_k$, . . . , etc. in the illustrated example. Based on the input prompt 222, the machine learning model 202 is operable to generate a summary 118 of the dialogue 122.

FIG. 4 depicts an example 400 of a comparison between a summary generated using conventional techniques and a summary generated in accordance with the techniques described herein in a first stage 402, a second stage 404, and a third stage 406. As depicted in the first stage 402, a dialogue 122 is received that includes an example transcript 408 of a conversation between a first party, e.g., a user inquiring about travel plans, and a second party, e.g., an individual responding to queries of the first user such as a travel agent and/or chatbot. In this example, the dialogue 122 describes requests by the first party to book a train and lodging accommodations. Notably, the first several dialogue turns of the transcript 408 have dialogue states that include a relevant semantic slot "train."

Second stage 404 depicts a summary of the transcript 408 generated using a conventional approach, e.g., an approach that does not consider the dialogue nature of the transcript 408 and/or does not leverage intrinsic domain knowledge of the transcript 408 to generate the summary. Accordingly, the summary shown in second stage 404 fails to include relevant information about the transcript 408, such as information related to booking a train. This example demonstrates that conventional techniques fail to include relevant information for input documents that are noisy or include domain-specific information, in this case information related to booking the train.

Third stage 406, on the other hand, depicts a summary 118 generated in accordance with the techniques described herein. For instance, the summary is generated using the machine learning model 202, which has been trained using clusters 210 as prefixes in a prefix-tuning approach as described above. The input to the machine learning model 202 is an input prompt 222 that includes a dialogue embedding 224 based on the transcript 408, a cluster prefix 216, and one or more default prefixes 218. Accordingly, the machine learning model 202 is influenced to consider dialogue-specific aspects and leverage sentence-level topical knowledge when generating a summary 118 of the transcript 408. Thus, the summary 118 depicted in third stage 406 provides holistic coverage of relevant information from the transcript 408, such as the dialogue turns related to booking a train as well as finding lodging. In this way, the techniques described herein overcome the technical limitations and challenges of conventional techniques, which "miss" key information when used in unfamiliar domains and/or receive noisy inputs.

FIG. 5 depicts an example 500 of updating a summary of a transcript from a videoconference in real time in accordance with the techniques described herein in a first stage 502 and a second stage 504. In the illustrated example, four individuals are participants in an online video conference. For instance, the individuals are collaborating in a virtual "war room" to resolve a critical incident involving problems with a recommendation engine. As depicted, a transcript 506 is generated for display in a user interface 110 based on an ongoing conversation and is updated in real-time throughout the course of the video conference, e.g., as the participants converse. Because the transcript 506 is based on the ongoing conversation, the transcript 506 is noisy, e.g., includes multiple speakers, speech recognition errors, speaker hesitations, repetitions, etc. Further, the transcript 506 includes domain-specific information related to the recommendation engine. Accordingly, conventional summarization techniques struggle to generate accurate summaries of such dialogues.

In the first stage 502, the transcript 506 represents an input dialogue 122. Accordingly, a summarization module 116 generates a first summary 508 based on the transcript 506 in accordance with the techniques described herein. The first summary 508 includes relevant information about the transcript 506, e.g., for a "first part" of the online video conference. For instance, the first summary 508 describes that "users reported incorrect recommendations being displayed an hour ago. The problem may be with recent changes to the data pipeline involving a new cache mechanism. There has been no unusual behavior in the logs or resource utilization."

Second stage 504 depicts a continuation of the online video conference, such as at a later point in the video conference. Accordingly, the summarization module 116 is operable to generate a second summary 510 for display in the user interface 110 that is based on updated content included in the transcript 506. For example, the second summary 510 represents an updated version of the first summary 508. The second summary 510 describes that "users reported incorrect recommendations being displayed an hour and a half ago. The root cause may be related to a user preference module returning incorrect data. A customer-facing message that explains the issue is being drafted." Accordingly, the summarization module 116 incorporates dialogue-specific features and leverage sentence level topical information when generating the second summary 510. In this way, the techniques described herein are usable to iteratively update summaries of dialogues that include noisy and/or domain-specific information in real time.

Example System and Device

Figure 8:
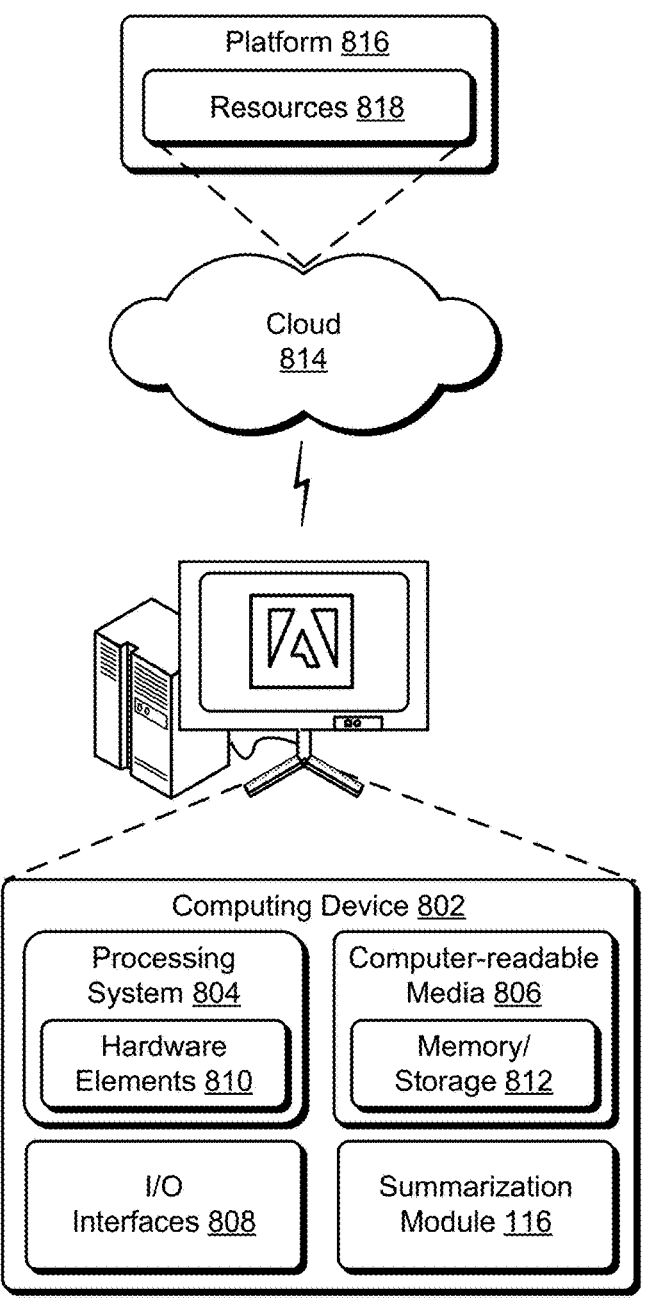
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the summarization module 116. The computing device 802 is configurable, for example, as a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812. The memory/storage 812 represents memory/storage capacity associated with one or more computer-readable media. The memory/storage 812 includes volatile media (such as random-access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, a machine learning model configured for dialogue summary generation, the machine learning model trained using a prefix-tuning approach in which one or more cluster prefixes corresponding to one or more clusters are optimized during training, the one or more clusters based on dialogue states of training dialogs from one or more source domains;
   receiving, by the processing device, an input including a dialogue from a target domain different than the one or more source domains;
   generating, by the processing device, an input prompt for the machine learning model that includes an embedding of the dialogue and a cluster prefix from the one or more cluster prefixes; and
   processing, by the machine learning model during inferencing, the input prompt to generate a summary of the dialogue as guided by the cluster prefix.

2. The method as described in claim 1, wherein each training dialogue includes a plurality of dialogue turns, and the one or more clusters are based on dialogue states of the plurality of dialogue turns.

3. The method as described in claim 2, wherein the dialogue states of the plurality of dialogue turns are determined using a pretrained dialogue state tracker and include structured data that represent semantic attributes of the plurality of dialogue turns.

4. The method as described in claim 1, wherein the one or more clusters are generated using an unsupervised k-means clustering and represent sentence level topical information of the training dialogues.

5. The method as described in claim 1, wherein the generating the input prompt includes generating the embedding of the dialogue based on tokens from the dialogue, generating the cluster prefix based on the one or more clusters, and combining the embedding of the dialogue with the cluster prefix.

6. The method as described in claim 5, wherein the machine learning model is trained using the one or more clusters as prefixes in a prefix-tuning approach to learn tunable parameters of a default prefix, and the input prompt includes the embedding of the dialogue, the cluster prefix, and the default prefix generated by the prefix-tuning approach to guide the machine learning model during the inferencing.

7. The method as described in claim 1, wherein the dialogue is a document that includes a transcript of a conversation particular to the target domain, and the training dialogues each include a transcript of a conversation particular to the one or more source domains, a training summary, and one or more dialogue state annotations.

8. The method as described in claim 1, wherein the one or more clusters are based on a first set of hidden representations that includes embeddings of each sentence of the training dialogues and a second set of hidden representations that includes embeddings of dialogue states of dialogue turns of the training dialogues.

9. A system comprising:
   a memory component; and
   a processing device coupled to the memory component, the processing device to perform operations comprising:

receiving a machine learning model trained using a prefix-tuning approach in which one or more cluster prefixes corresponding to one or more clusters are optimized during training the one or more clusters based on dialogue states of training dialogs from one or more source domains;

receiving an input including a dialogue from a target domain different than the one or more source domains; and generating, as part of inferencing by the machine learning model, a summary based on an embedding of the dialogue as guided by a cluster prefix selected from the one or more cluster prefixes.

10. The system as described in claim 9, wherein the generating includes one or more default prefixes generated using a prefix-tuning approach to train the machine learning model.

11. The system as described in claim 9, wherein the one or more clusters are generated using an unsupervised k-means clustering, the one or more clusters representative of sentence level topical information of the dialogues.

12. The system as described in claim 9, wherein each annotated dialogue includes a plurality of dialogue turns, and the one or more clusters are based on a first set of hidden representations that includes embeddings of each dialogue turn.

13. The system as described in claim 12, wherein the one or more clusters are based on a second set of hidden representations that includes embeddings of dialogue states of each dialogue turn.

14. The system as described in claim 13, wherein the dialogue states are determined as slot-value pairs using a pretrained dialogue state tracker.

15. The system as described in claim 9, wherein the dialogue includes a transcript of an ongoing conversation, and generating the summary of the dialogue includes updating the summary based on the transcript of the ongoing conversation.

16. A non-transitory computer-readable storage medium storing executable instructions, which when executed by a processing device, cause the processing device to perform operations comprising:

receiving a training dataset that includes a plurality of training dialogues from one or more source domains;

generating one or more clusters that are based in part on dialogue states of the plurality of training dialogues; and training a machine learning model to generate summaries of input dialogues from unseen domains using a prefix-tuning approach in which one or more cluster prefixes corresponding to one or more clusters are optimized during training to guide the machine learning model during inferencing.

17. The non-transitory computer-readable storage medium as described in claim 16, wherein the generating the one or more clusters includes:

generating a first set of hidden representations for a particular training dialogue by embedding each dialogue turn of the particular training dialogue;

determining dialogue states for each dialogue turn of the particular training dialogue; and generating a second set of hidden representations for the determined dialogue states, and wherein the one or more clusters are based on the first set of hidden representations and the second set of hidden representations.

18. The non-transitory computer-readable storage medium as described in claim 17, wherein the generating the one or more clusters includes combining the first set of hidden representations and the second set of hidden representations to generate a combined set of hidden representations; and performing an unsupervised k-means clustering on the combined set of hidden representations to generate the one or more clusters.

19. The non-transitory computer-readable storage medium as described in claim 16, further comprising receiving an input including a dialogue from a target domain different than the one or more source domains and generating a summary of the dialogue using the machine learning model.

20. The system as described in claim 9, wherein the cluster prefix includes a sequence of continuous task-specific vectors with one or more parameters optimized during training to guide the machine learning model to perform dialogue summarization on dialogues from unseen target domains during inferencing.

* * * * *